Oct. 10, 1967 — G. W. PONCY — 3,346,731
INFLATABLE, ILLUMINATABLE GLOBE
Filed May 25, 1965 — 2 Sheets-Sheet 1
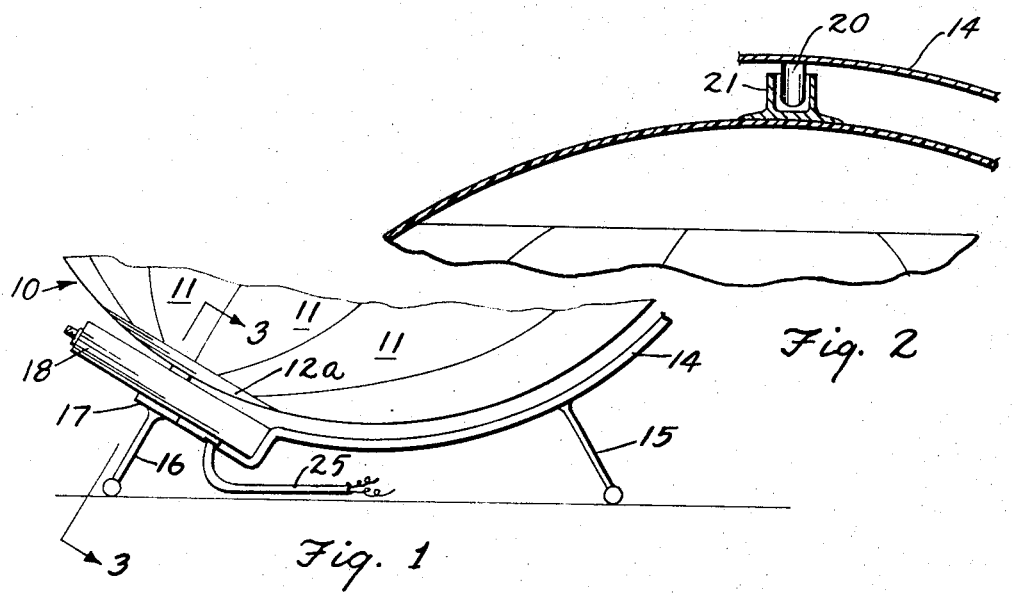
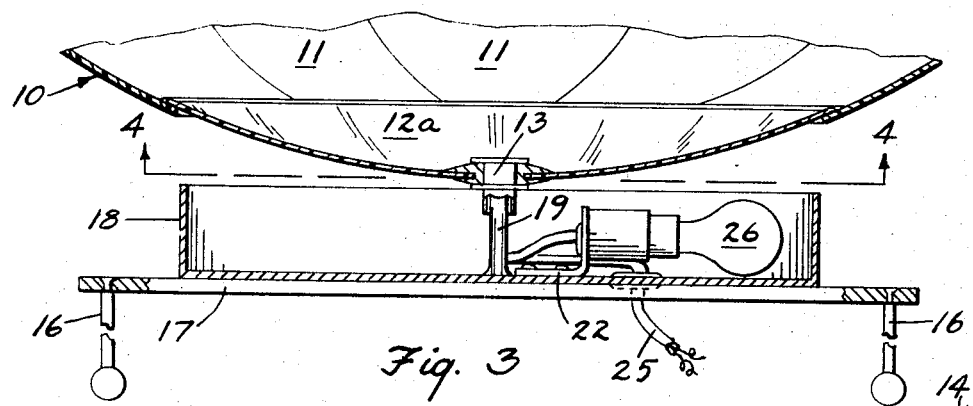
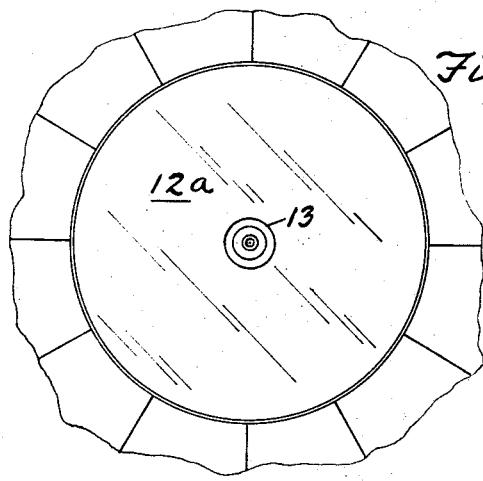
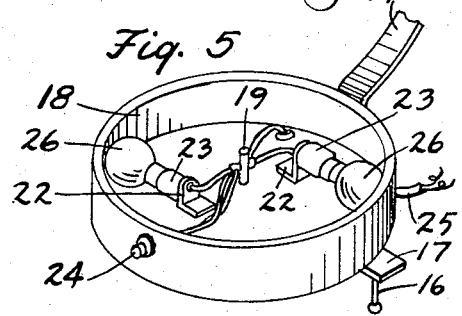
INVENTOR
GEORGE W. PONCY
BY
ATTORNEY

United States Patent Office 3,346,731
Patented Oct. 10, 1967

3,346,731
INFLATABLE, ILLUMINATABLE GLOBE
George W. Poncy, 59 Dale Drive
Chatham, N.J. 07928
Filed May 25, 1965, Ser. No. 458,713
5 Claims. (Cl. 240—2)

ABSTRACT OF THE DISCLOSURE

An inflatable globe of the world mounted on a stand, the globe having a transparent area at its south pole and being interiorly lighted by external lighting means supported by the stand, the globe having bearings and the stand having trunnions engaging said bearings, one of the trunnions forming one of the legs supporting the stand.

---

This invention relates to an illuminatable, inflatable globe of the world. Illuminated globes have heretofore been patented, but these have been of the rigid type which are heavy, awkward to handle, ship and store. The present invention overcomes these serious disadvantages by presenting a light weight, collapsible globe which is easily inflatable by mouth or otherwise, which can be packed and shipped in flat or deflated condition, and which occupies little space when so packed for shipping and storing. This factor, in itself, greatly reduces the final cost of the globe to the purchaser.

An object of the invention, therefore, is to produce an attractive, light weight, inflatable and illuminatable globe which can easily be handled and set up and used in the home, classroom, or elsewhere, and which is greatly reduced in cost as compared with known types of globes of similar character, quality and utility.

A further object of the invention is to present such a globe which, although externally lighted, gives the appearance of being lighted from within, the lighting mechanism being substantially concealed from view. The result, especially as the globe is made in color, is very striking and pleasing and it further renders the globe more legible and readable.

For a more complete description of the invention, reference is made to the accompanying drawing and specification, wherein like parts are indicated by similar reference characters, the drawings delineating practical embodiments of the invention.

In the drawings:

FIGURE 1 is an elevation of a portion of a globe according to this invention, on a portion of its supporting stand.

FIGURE 2 shows a detail of the globe at its north pole, illustrating the manner of its support at that point.

FIGURE 3 is a sectional view taken along the line 3—3 of FIGURE 1.

FIGURE 4 is a fragmentary plan view of the globe at its south pole.

FIGURE 5 is a perspective view of the means for lighting the globe and the manner of supporting the same.

Figure 6:
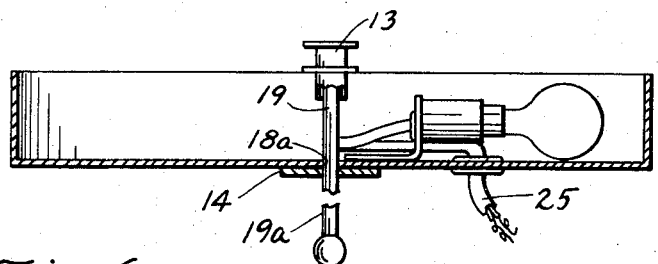
FIGURE 6 is a cross sectional view through a modified form of the globe support.

According to this invention, the globe is interiorly lighted by external means. The globe 10 is made of a plurality of gores 11 of translucent, polyvinyl chloride plastic, or other suitable material, heat sealed together and joined to polar caps 12, 12a at its opposite poles in similar fashion. The south polar cap 12a is of a clear, transparent material and has bearing member 13 secured thereto. A support for the globe comprises an arcuate supporting arm or stand 14 having a leg 15. Two additional legs are suitably joined to a cross member 17, and the cross member and arm 14 are suitably connected to an enlarged dished or cupped member 18 by means of screws, rivets (not shown), or otherwise, as desired. The three legs support the cup, globe and the arcuate supporting arm. The cross member 17 and the arm 14 are arranged substantially at a right angle to one another at the bottom of the cup member. A pin or trunnion 19 is permanently fastened to the base of the cup 18 at its central point, and this pin is adapted to engage the rotatable bearing 13, as shown in FIGURE 3, to support the globe at its south pole. At its north pole, the globe is supported in the manner shown in FIGURE 2, the arm 14 having a downwardly extending trunnion 20, received by the open end of the bearing 21, which also serves as a valve for inflating the globe, the valve structure not being shown. Thus, the globe may be rotated manually on the bearings 13 and 21.

Within the cup 18, a pair of brackets 22 are permanently mounted in any suitable manner, one on each side of the pin 19, as shown in FIGURE 5, and each bracket supports a lamp socket 23, wired to a switch 24, mounted on the side wall of the cup member 18. A suitable electrical conductor 25 is provided for connecting each lamp with a source of electric current. The inside surface of the cup 18 may be made reflective if desired, although this is not necessary. When the lamps 26 are lighted, the light rays will be projected through the transparent polar cap 12a and will light up the interior of the globe in a clear and pleasing manner. Due to their position within the cup, the lamps themselves will remain substantially invisible and concealed from view. Thus, the invention presents a globe of the world which is inflatable, collapsible, and capable of being illuminated from within in a manner which is substantially concealed from view, and which results in an assembly much lighter in weight than known globes which have heretofore been available.

Figure 7:
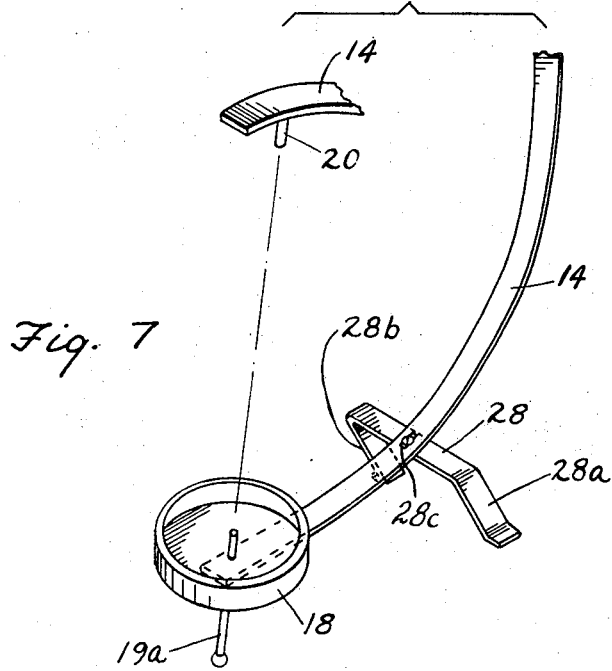
FIGURE 7 is a perspective view of the globe supporting means embodying the modification of FIGURE 6.
Figure 8:
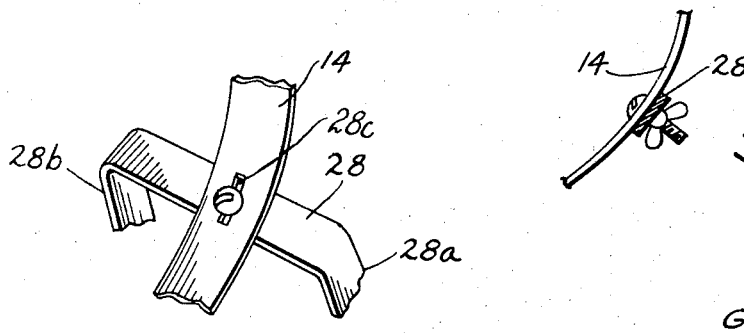
FIGURES 8 and 9 are details of the means for fastening supporting legs to the globe support.
Figure 9:
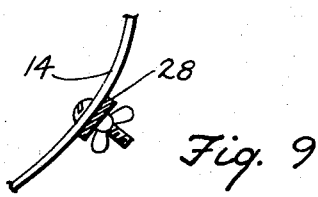

In the modified form of support shown in FIGURES 6 and 7, the central pin or trunnion member 19 projects through an opening 18a formed in the bottom of the cupped or dished member 18, and forms a supporting leg 19a, which supplants the crossbar 17 and the two legs 16 of FIGURE 3. The pin may be secured to the cup by a welding, upsetting or swaging operation well known in the art. In this form of the invention, the stand 14 may be fastened to the cup by passing the pin 19 through it as shown in FIGURES 6 and 7, the parts being secured together by the upsetting or swaging of either the pin over the cup bottom, or the cup bottom against the pin. Additional support for the globe assembly is provided by means of a bar 28 bent at an angle at each end to form two downwardly extending legs 28a, 28b. The bar 28 is suitably fastened to an appropriate point on the stand 14 through a hole or slot 28c formed therein, by means of a screw and wing nut, or otherwise.

While particular and practical embodiments have been shown in the drawings, changes in the design, construction and arrangement of parts may be made without departing from the spirit of the invention as defined by the appended claims.

I claim:

1. An inflatable, illuminatable globe having opposite poles with an outwardly facing socket bearing at each pole, a support therefor comprising a stand having an arcuate arm partly encircling said globe, said arm having a trunnion at each end for engaging in said socket bearings, and at least one leg between said trunnions to support said arm, one of said trunnions forming an additional leg for said arm.

2. A combination according to claim 1, in which the globe has a transparent area adjacent said last named trunnion and means adjacent said area to illuminate said globe through said area.

3. A combination according to claim 2, in which said illuminating means comprises a cupped member about said last named trunnion, and lighting means supported within said cupped member.

4. A combination according to claim 3, in which said cupped member and said stand are secured by said trunnion.

5. An inflatable, collapsible and illuminatable, rotatable globe of the world having a pair of poles and comprising a flexible, translucent body having a transparent area adjacent one of said poles, a bearing secured to the globe at each pole, a stand for supporting said globe for rotation in an inflated condition, a trunnion on said stand engaging one of said bearings, a dished member on said stand adjacent said transparent area, said dished member containing lighting means to illuminate said globe through said area, said dished member having a trunnion therein, said trunnion engaging the other bearing of said globe, said trunnion extending through said dished member to provide a supporting leg for said globe, said last named trunnion connecting said stand to said dished member.

References Cited

UNITED STATES PATENTS

| | | | |
|---|---|---|---|
| 1,745,649 | 2/1930 | Stanford et al. | 240—2 |
| 2,279,162 | 4/1942 | Dupler | 240—2 |
| 2,641,683 | 6/1953 | Dupler | 240—2 |
| 2,643,598 | 6/1953 | Carroll | 240—2 |

NORTON ANSHER, *Primary Examiner.*

DAVID L. JACOBSON, *Assistant Examiner.*